Dec. 8, 1931.  J. E. ZELLER  1,834,990
ELECTRICAL EQUIPMENT TESTER
Filed March 26, 1929  2 Sheets-Sheet 1
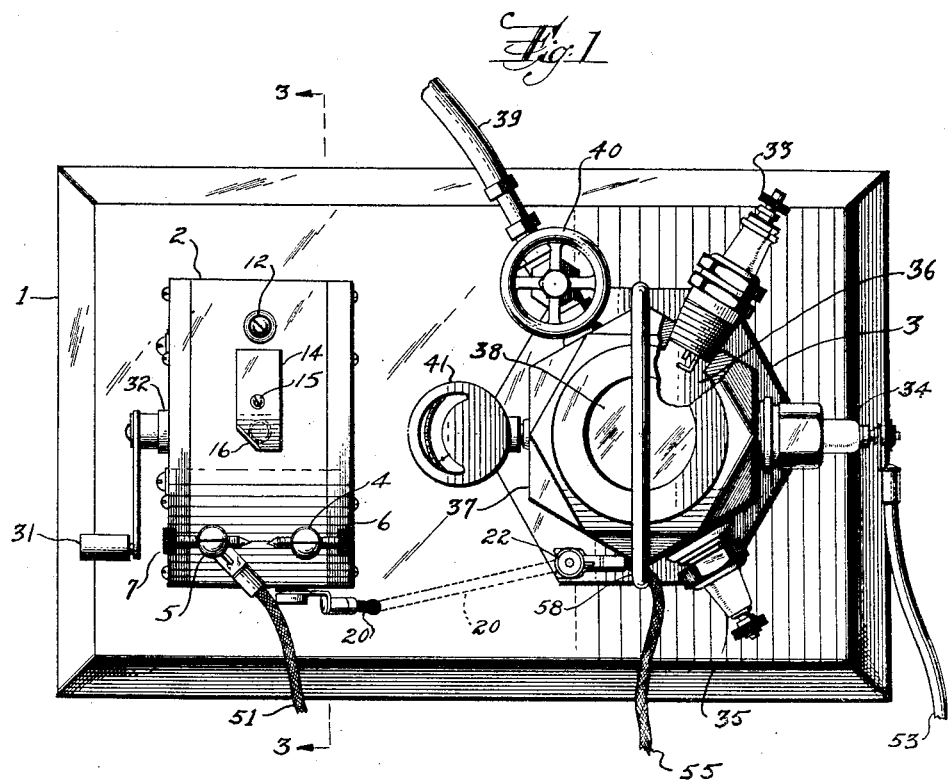
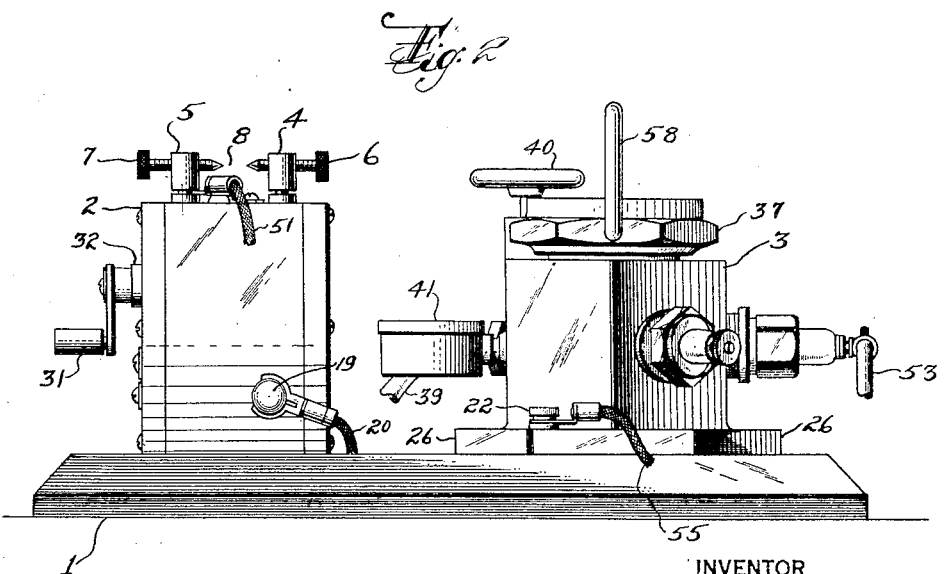
INVENTOR
JOHN E. ZELLER
BY
George D. Richards
ATTORNEY Dec. 8, 1931.  J. E. ZELLER  1,834,990
ELECTRICAL EQUIPMENT TESTER
Filed March 26, 1929   2 Sheets-Sheet 2

INVENTOR
JOHN E. ZELLER
BY
George D. Richards
ATTORNEY

Patented Dec. 8, 1931

1,834,990

UNITED STATES PATENT OFFICE

JOHN E. ZELLER, OF UPPER MONTCLAIR, NEW JERSEY

ELECTRICAL EQUIPMENT TESTER

Application filed March 26, 1929. Serial No. 350,007.

This invention relates to means for testing electrical equipment, and the invention has reference, more particularly, to a novel electrical equipment tester especially adapted for testing the ignition equipment of an internal combustion engine and particularly such equipment used in connection with automobile engines.

It is the principal object of the present invention to provide a novel electrical equipment tester that is capable of thoroughly testing the ignition equipment of internal combustion engines, said tester having make and break means adapted to take the place of the ignition breaker of an internal combustion engine ignition system during test and also having spark gap means together with a pressure chamber for determining the relative efficiency of spark plugs, plug leads, etc.

Another object of the invention lies in the provision of an electrical equipment tester of the above character that is of simple construction and which is easily and quickly operated to make the desired tests.

Other objects of this invention not at this time more particularly enumerated, will be clearly understood from the following detailed description of the same.

The invention is clearly illustrated in the accompanying drawings, in which:—

Fig. 1 is a plan view of the novel electrical equipment tester of this invention;

Fig. 2 is a view in elevation of the structure of Fig. 1;

Similar characters of reference are employed in all of the hereinabove described views, to indicate corresponding parts.

Figure 3:
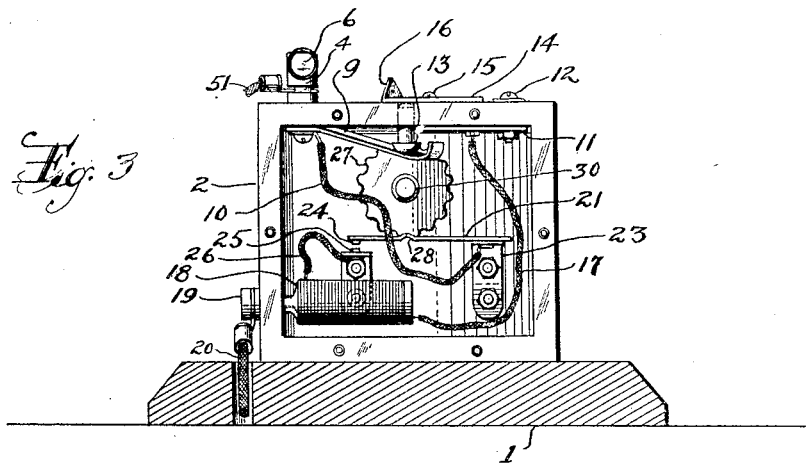
Fig. 3 is a sectional view taken along line 3—3 of Fig. 1.

Referring now to Figs. 1 to 3 of said drawings, the novel electrical equipment tester of this invention comprises a base 1 upon which is mounted a control-box 2 and a spark plug pressure casing 3. The control-box 2 is made of suitable insulating material, such as wood, and has two external conducting terminal posts 4 and 5 mounted on the top thereof. The thumb screws 6 and 7 are threaded through the terminal posts 4 and 5 respectively, and the inner ends of the shanks of these screws are pointed and project toward one another so as to provide an adjustable spark gap 8 therebetween.

The terminal post 4 is merely mounted upon the control-box 2, whereas terminal post 5 is electrically connected to a spring contact member 9 and to a lead 10 contained within this control-box. Spring contact member 9 is adapted to cooperate with a stationary contact member 11 secured as by a screw 12 to the inner surface of the top of control-box 2. The resiliency of spring contact member 9 biases this member to engage or contact with the stationary contact member 11, whereas an insulating button 13 is employed in separating these contact members. The shank of button 13 extends upwardly through an aperture in the top of control-box 2 and the upper end of this shank is adapted to be engaged by a manually operated cam plate 14 that is pivoted upon a screw 15 extending into the top of the control-box. When button 13 is not engaged by cam plate 14, the spring contact member 9 engages contact member 11 and the shank of button 13 projects above the top surface of the control box. By moving the cam plate 14 so that the camming surface 16 rides against the shank of button 13, this button is forced downwardly into the position shown in the figures, in which position the contacts 9 and 11 are held separated. The stationary contact member 11 is electrically connected by a lead 17 to one plate of a condenser 18. The second plate of condenser 18 is connected to a binding post 19 that extends through the side wall of the control-box 2 and has a lead 20 connected thereto. Lead 20 extends through suitable apertures in the base 1 and is electrically connected to the base 26 of the pressure casing 3 by means of a binding post 22.

The lead 10 extends from terminal post 5 and is electrically connected to a movable contact arm 21 mounted upon a bracket 23 within the control-box. The movable contact arm 21 carries a contact 24 that is adapted to cooperate with a similar stationary contact 25 mounted on a suitable bracket. Stationary contact 25 is connected by a lead 26 to the binding post 19. The movable contact arm 21 is resilient and tends to spring upwardly, thereby separating contacts 24 and 25. This movable contact arm is adapted to be depressed, so as to cause its contact 24 to engage contact 25, by means of a toothed wheel 27 engaging a projection 28 formed on this contact arm. Toothed wheel 27 is fixed upon a shaft 30 that is rotatably supported in a bearing 32 extending through the end wall of the control-box. The portion of shaft 30 that extends outwardly of bearing 32 has a crank handle 31 secured thereto. By turning crank handle 31, the toothed wheel 27 acts to vibrate movable contact arm 21 so as to rapidly make and break contacts 24 and 25.

The pressure casing 3 is illustrated as being of substantially hexagonal shape, having six side walls provided with threaded apertures into which spark plugs, such as plugs 33, 34 and 35 are adapted to be threaded. Pressure casing 3 is hollow so as to provide an interior compression chamber 36 communicating with the spark plugs 33 to 35. The upper end of the compression chamber 36 is closed by a screw cap 37 having a transparent window 38 of glass or other suitable material. By looking through window 38, the operation of spark plugs 33 to 35 may be observed. Compressed air is adapted to be supplied to the compression chamber 36 through a pipe 39. A valve having a manually operated handle 40 is included in the pipe 39 and is adapted to regulate the air pressure within the compression chamber 36. A pressure gage 41 is threaded through a wall of the pressure casing and is adapted to indicate the air pressure within compression chamber 36. A handle 58 is provided on the screw cap 37 to enable the ready carrying of the electrical equipment tester from place to place.

Figure 4:
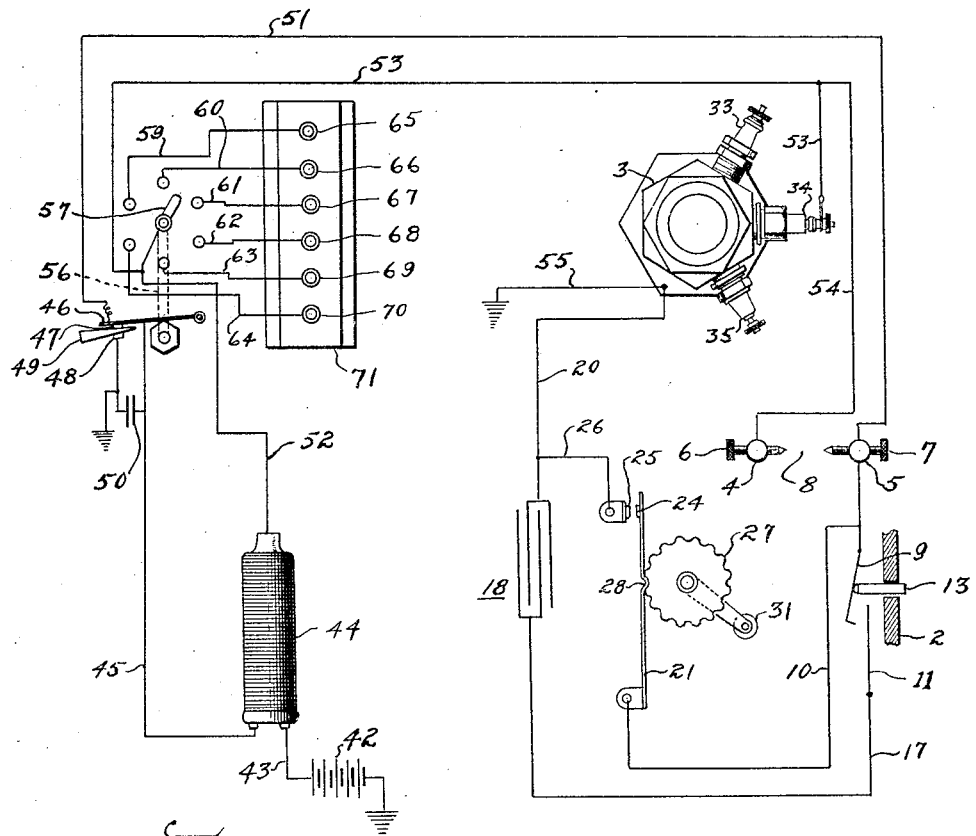
Fig. 4 is a wiring diagram illustrating the use of the novel tester for testing the electrical ignition equipment of an automobile.

In Fig. 4 the several parts of the novel electrical equipment tester are illustrated diagrammatically and one manner of connecting this tester to portions of the ignition equipment of an automobile is also disclosed. In this figure, the reference character 42 indicates the car storage battery which has one terminal connected to ground and its other terminal connected by a lead 43 to one low tension terminal of the induction coil 44. The other low tension terminal of the induction coil 33 is connected by a lead 45 to the contact arm 46 of the ignition-breaker. The contact 47 of the contact arm 46 is illustrated as pryed apart from the stationary contact 48 by an insulating wedge 49 such as a tooth pick. As is common, a condenser 50 is illustrated as bridging the contacts 47 and 48, one side of the condenser 50 and the contact 48 being illustrated as suitably grounded. A flexible disconnectible lead 51 is shown as connecting the contact arm 46 with terminal post 5 of the tester. The high tension terminal wire 52 of the high tension winding of induction coil 44 is connected by a disconnectible lead 53 to spark plug 34 which in this test is a new or good plug and which is screwed into the pressure casing 3. The low tension terminal of the high tension winding of inductive coil 44 is connected in the usual way to ground through the transformer core or through the low tension winding. An additional disconnectible lead 54 connects lead 53 to the terminal post 4. The pressure casing 3 is grounded by a lead 55 connected to binding post 22. The contact arm 46 is illustrated as being operated by a cam 55 in the conventional manner. The cam 55 is mounted on the timer shaft 56, which also carries the distributor arm 57. The distributor arm 57 is adapted to supply high tension current in the usual manner through suitable terminals and flexible plug leads 59 to 64 to the spark plugs 65 to 70 of the engine 71.

In operation, to test the battery 42, induction coil 44, car condenser 50 and connecting wiring, the thumb screws 6 and 7 of the tester are first turned so as to provide a relatively wide gap 8, and the cam plate 14 is positioned over button 13 so as to depress the spring contact member 9. With the contacts 46 and 48 of the ignition-breaker pried apart and the new or good spark plug 34 provided with a thirty-five thousandths of a inch gap, the car switch is turned on and, with the engine not running the crank handle 31 is turned, causing the toothed wheel 27 to rapidly make and break contacts 24 and 25. An intermittently interrupted current now flows from the battery 42 through lead 43, induction coil 44, lead 45, contact arm 46, lead 51, through terminal post 5, lead 10, movable contact arm 21, contacts 24 and 25, lead 26, lead 20, and lead 55 to ground. This circuit is rapidly and periodically made and broken at the contacts 24 and 25, thereby causing a correspondingly timed high tension current to be delivered through lead 52 from the induction coil. This high tension current is conducted from lead 52 through lead 53 to spark plug 34, and, if the induction coil, car condenser, storage battery and connected wiring are all properly functioning, the plug 34 will fire without missing, even though the air pressure within the compression chamber 36 is raised to a value equivalent to or somewhat greater than the normal engine compression. Thus if the pressure at normal compression is 120 pounds, the plug 34 should fire without missing when the gage 41 shows a pressure of 120 pounds within the compression chamber 36. Should the spark plug 34 fail to fire regularly without missing at intervals, cam plate 14 may be moved so as to release the button 13, thereby enabling spring contact member 9 to engage stationary contact member 11. The engagement of these contact members places the tested condenser 18 of the tester across the terminals 47 and 48 of the ignition-breaker and if a good spark is now attained upon the continued turning of handle 31, it is evident that the car condenser is defective, whereas the car battery and induction coil are performing properly. On the other hand if the spark plug 34 still continues to miss or if the spark is absent, this is an indication that either the induction coil is defective or that it is not getting sufficient voltage from the battery. In such case the battery and battery lead connections should be tested and after these parts have been put in proper condition, if the plug still continues to miss, it is evident that the induction coil is bad and should be replaced or repaired.

In testing the engine spark plugs, they are inserted into the apertures provided for them in the pressure casing 3 and are then subjected to an air pressure substantially equal to or somewhat greater than that of normal engine compression. The desired air pressure is obtained by turning valve handle 40 while watching pressure gage 41. The conductor 53, leading from the high tension terminal wire 52, is then connected to these spark plugs in succession while turning crank handle 31. With a plug operating satisfactorily, an intermittent current flows from lead 52 through lead 53, the spark plug, pressure casing 3 and lead 55 to ground. For satisfactory operation of the spark plugs during normal use in the engine, it is necessary that they be tested at a pressure equal to or somewhat greater than that of normal engine compression. Thus, for example, if after subjecting the spark plugs within the pressure chamber to a pressure from 10 to 20 pounds greater than the compression of the engine, should any of the plugs fail to fire or should any of them spark around their insulator they are defective. Also, should it be necessary to reduce the gap of any plug more than two thousandths of an inch below that of a standard plug to obtain sparking while being tested at such pressure, it is evident that such plug should be replaced.

To test the loss in efficiency of the engine spark plugs when these plugs appear to be in good condition, the spark gap 8 is employed. The flexible lead 53 is connected at one end as before to the high tension terminal 52 as shown in Fig. 4 and its other end is connected to a new plug 34 threaded into the pressure casing 3. The thumb screws 6 and 7 are adjusted so as to gradually reduce the size of the spark gap 8 until sparks begin to jump across this gap while the crank handle 31 is being turned rapidly. An engine plug is then threaded into the pressure casing 3 and it is likewise tested. Since this spark plug and the spark gap 8 are in parallel, the high tension current will flow through one or the other of these members, inversely in accordance with their resistances. Thus as long as the gap 8 is of sufficient width so as to have a greater resistance than the plug being tested, the plug will fire, but just as soon as the spark plug 8 is reduced to a dimension so that its resistance is equal to or slightly below that of the plug, sparks will jump across this gap. The percentage of loss in efficiency of the engine plug being tested may now be determined from the difference in the dimension of the gap fired by such plug from that fired by the new plug. Thus, assuming that an engine plug, having a higher resistance than a new plug owing to its use in the engine, causes a spark to jump upon the spark gap 8 being reduced to one fourth of an inch, whereas when using the new plug the gap 8 was reduced to one eighth of an inch before firing took place across the gap. Thus it is evident that the engine spark plug has a resistance substantially twice that of a new plug and is therefore only 50% as efficient.

To test the engine plug wires 59 to 64, it is merely necessary to disconnect the flexible lead 53 from the high tension terminal wire 52 and to connect this end of lead 53 to the end of one of the plug wires where it connects to the plug, such wires being disconnected from its plug during the test. The engine is started and the firing of new plug 34 is observed. Thus, to test the plug wire 59 this wire is disconnected from plug 65 and its plug end is connected to lead 53, the lead having been disconnected from the high tension lead 52. The motor is now started and if the new plug 34, as observed through window 38, fires properly while the plug is subjected to a pressure equivalent to that of engine compression, it is evident that the plug wire 59 is in good condition. A failure to fire is an indication of the wire 59 being defective.

It is evident that other parts of the engine ignition equipment may readily be tested by use of the novel electrical equipment tester of this invention. Thus it will be evident that the distributor rotor arm, the distributor cap, and so forth, may be tested by inserting these members in the circuit, as between the binding post 22 and the ground lead 55. If the plug 34 continues to fire when these members are in the circuit, it is evident that they are short circuited and therefore defective.

It will be noted that the spark gap 8 serves as a means for quantitatively testing various parts of the ignition equipment and this gap may be used in place of the standard plug 34 by merely disconnecting the lead 53 from this spark plug. Thus the maximum width of gap 8 that the induction coil 44 is capable of firing is an indication of the strength of the coil and likewise the width of this gap that the plug leads 59 to 64 can fire without missing is an indication of their relative utility.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. An electrical equipment tester comprising, a base, a control-box mounted on said base, electrical make and break means mounted in said control-box, a terminal post mounted on said control-box, said terminal post being electrically connected to said make and break means and a pressure casing mounted on said base and adapted to be employed to subject spark plugs to pressure, said pressure casing being electrically connected to said make and break means.

2. An electrical equipment tester comprising, a base, a control-box mounted on said base, electrical make and break means mounted in said control-box, spark gap terminal posts mounted on said control-box, one of said terminal posts being electrically connected to said make and break means, a condenser, switch means for connecting said condenser across said make and break means, and means for mounting a spark plug in parallel with said gap.

3. An electrical equipment tester comprising, a base, a control-box mounted on said base, electrical make and break means mounted in said control-box, spark gap terminal posts mounted on said control-box, one of said terminal posts being electrically connected to said make and break means and a pressure casing mounted on said base, said pressure casing having an aperture adapted to receive a spark plug to be tested while subjected to compressed fluid contained within said pressure casing, said spark plug being adapted to be electrically connected to another of said spark gap terminal posts.

4. An electrical equipment tester for testing the ignition system of an internal combustion engine comprising, a base, a control-box mounted on said base, a terminal post carried by said control-box and adapted to be connected to the low tension outlet of an induction coil, cooperating contacts contained within said control-box, one of said contacts being electrically connected to said terminal post, manually operable means for rapidly closing and opening said contacts for causing an intermittent current to flow in the induction coil, a pressure casing mounted on said base and having apertures for receiving spark plugs that are adapted to be connected with the high tension outlet of the induction coil, said pressure casing and the other of said cooperating contacts being connected to ground.

5. An electrical equipment tester for testing the ignition system of an internal combustion engine comprising, a base, a control-box mounted on said base, cooperating contacts contained within said control-box, a pair of terminal posts providing an adjustable spark gap carried by said control-box, one of said terminal posts being electrically connected to one of said contacts and also adapted to be connected to the low tension outlet of an induction coil, a pressure casing having a transparent window mounted on said base and having an aperture into which a spark plug may be threaded, means for supplying fluid under pressure to said pressure casing, said pressure casing and the other of said contacts being grounded, manually operable means for intermittently opening and closing said cooperating contacts to make and break the circuit through the induction coil, and means for connecting the high tension terminal of the induction coil to the other of said terminal posts and to the spark plug threaded into said pressure casing.

6. An electrical equipment tester for testing the ignition system of an internal combustion engine comprising, a base, a control-box mounted on said base, cooperating contacts contained within said control-box, a condenser adapted to be shunted across said contacts, a pair of terminal posts providing an adjustable spark gap carried by said control-box, one of said terminal posts being electrically connected to one of said contacts and also adapted to be connected to the low tension outlet of an induction coil, a pressure casing having a transparent window mounted on said base and having an aperture into which a spark plug may be threaded, means for supplying fluid under pressure to said pressure casing, said pressure casing and the other of said contacts being grounded, manually operable means for intermittently opening and closing said cooperating contacts to make and break the circuit through the induction coil, and means for connecting the high tension terminal of the induction coil to the other of said terminal posts and to the spark plug threaded into said pressure casing.

In testimony, that I claim the invention set forth above I have hereunto set my hand this 23rd day of March, 1929.

JOHN E. ZELLER.